US007941290B2

(12) United States Patent
Bredau et al.

(10) Patent No.: US 7,941,290 B2
(45) Date of Patent: May 10, 2011

(54) METHOD FOR ERROR CONTAINMENT AND DIAGNOSIS IN A FLUID POWER SYSTEM

(75) Inventors: Jan Bredau, Esslingen (DE); Reinhard Keller, Ostfildern (DE)

(73) Assignee: Festo AG & Co. KG, Esslingen (DE)

( * ) Notice: Subject to any disclaimer, the term of this patent is extended or adjusted under 35 U.S.C. 154(b) by 423 days.

(21) Appl. No.: 12/085,338

(22) PCT Filed: Feb. 14, 2007

(86) PCT No.: PCT/EP2007/001268
§ 371 (c)(1), (2), (4) Date: May 20, 2008

(87) PCT Pub. No.: WO2008/098588
PCT Pub. Date: Aug. 21, 2008

(65) Prior Publication Data
US 2010/0153027 A1 Jun. 17, 2010

(51) Int. Cl.
*G01L 25/00* (2006.01)
*G01F 17/00* (2006.01)

(52) U.S. Cl. .............................. 702/114; 702/50; 702/51

(58) Field of Classification Search .................... 702/35, 702/45, 47, 50, 51, 55, 140, 114; 72/15.1, 72/17.2, 357; 73/37, 861.42, 861.73, 864.25
See application file for complete search history.

(56) References Cited

U.S. PATENT DOCUMENTS 7,031,850 B2 * 4/2006 Kambli et al. .................. 702/51
2003/0187595 A1 10/2003 Koshinaka et al.

FOREIGN PATENT DOCUMENTS

DE 100 52 664 5/2002
WO WO 2005/111433 11/2005

OTHER PUBLICATIONS

WO 2005/111433, Nov. 24, 2005, Bredau et al. (English translation).*

* cited by examiner

*Primary Examiner* — John H Le
(74) *Attorney, Agent, or Firm* — Hoffman & Baron, LLP

(57) ABSTRACT

In a method for error containment and diagnosis in a fluid power system the fluid volumetric flow in the overall system or at least a part thereof and the fluid pressure (P) is detected as a measurement quantity in each case during a duty cycle and is compared with stored references. In each case at the point in time of a deviation or a change in the deviation from the reference it is determined at which component or at which components (10 through 14) of the system an event has occurred influencing fluid consumption in order to recognize same as subject to error. Guide value quantities (Q/P) are derived from the respective volumetric flow values (Q) and the measured pressure (P) and are integrated or summated over the duty cycle to form guide values (KD), a corresponding guide value reference curve (KDref) as a reference being chosen from a stored selection matrix, which has the guide value reference curves (KDref) or time dependent guide values for different operating conditions.

20 Claims, 2 Drawing Sheets

METHOD FOR ERROR CONTAINMENT AND DIAGNOSIS IN A FLUID POWER SYSTEM

This application claims priority based on an International Application filed under the Patent Cooperation Treaty, PCT/EP2007/001268, filed Feb. 14, 2007.

BACKGROUND OF THE INVENTION

The invention relates to a method for error containment and diagnosis in a fluid power system in which the fluid volumetric flow in the overall system or at least a part thereof and the fluid pressure is detected in each case during a duty cycle and is compared with stored references and in each case at the point in time of a deviation or a change in the deviation from the reference it is determined at which component or at which components of the system an event has occurred influencing fluid consumption in order to recognize same as subject to error.

In the case of with a method as described in the patent publication WO 2005/111433 A1 the air consumption curve is evaluated for error localization. In the case of deviations from a reference a conclusion is made from the point in time of the deviation as regards the faulty subsystem (for example a valve actuator unit). Such faults, which may occur in fluid power systems, are for example caused by wear of the components, faulty assembly, loose screw joints, porous hose, process errors or the like, which are expressed in movements of the fluid drives, and other defects in seals of the most various different kinds. In order to avoid diagnosis errors due to changes in certain marginal conditions, such as pressure and temperature, the publication mentions possible correction of air consumption with the pressure and temperature. The method for this is however not described and time-dependent or, respectively, batch-dependent fluctuations can not be taken into account.

SUMMARY OF THE INVENTION

One object of the present invention is to so improve the method of the type initially mentioned that changes in marginal conditions and more particularly different operational states can be so taken into account that they do not entail a wrong diagnosis.

This aim is to be attained in accordance with the invention by a method with the features of claim 1 herein.

The advantage of the method in accordance with the invention is more particularly that the diagnosis by means of the guide value involves a simple way of compensating natural fluctuations in a fluid system caused by unavoidable pressure and/or temperature fluctuations. Moreover, it is also possible to take into account different operational states by the selection of stored guide value reference curves. The comparison of the guide value with a reference and any possible time related and also amount related deviations renders possible extremely accurate statements as regards the type of the error and the position thereof. Accordingly it is also advantageously possible to state whether leakages (altered air consumption) are the cause of the error or whether the source of the error is due to changed actuator motion; for example slower cycle times due to friction, wear, slower switching of control valves or the like.

The measures recited in the dependent claims represent advantageous further developments and improvements in the method defined in claim 1.

The different operational states, for which for the guide value reference curves are stored as selections, preferably relate to warming up, operation after a prolonged idle time, restarting after retooling and operation after predeterminable time intervals.

The guide value quantities are compensated for a still better adaptation to the behavior of the entire system in a manner dependent on temperature and more particularly by a factor of $1/\sqrt{T}$, T being the operating temperature. In order to perform an adaptation to suit different fluids employed the guide value quantities may also be adapted in a fluid dependent fashion, more particularly using the factor $\sqrt{K_F}$, where $K_F$ is a fluid dependent characteristic. Even more accurate diagnosis data and diagnosis predictions may be obtained by adaptation of the guide value amount to reflect the moisture content and/or the particle content of the respective fluid, more particularly using the factor $1/\sqrt{K_H}$, $K_H$ being a characteristic dependent of the moisture and/or particle content.

In order to be able to reflect different operating states i. e. to ensure that the comparison between the reference value and the current guide value yields a definite statement, the selected reference must correspond to the corresponding operating state. This means that from the stored selection matrix the guide value reference curve corresponding to the respective operating state has to be chosen. In an advantageous fashion for this purpose prior to the diagnosis for leakage the run duration of a duty cycle is checked by a comparison of the current guide value measurement curve with a guide value reference curve assigned to this duty cycle, switching over to at least one further guide value reference curve only be implemented as from a predeterminable deviation. If a run duration deviation is detected, then in addition the existence of a proportional shift in time between the current guide value measurement curve and the guide value reference curve is checked for and it is only in the case of a proportional time shift being detected that switching over to at least one further guide value reference curve takes place. If a check of all guide value reference curves shows that in every case the predetermined deviation is exceeded, this will mean that the entire system is far outside the working point and a corresponding message is produced. The diagnosis for leakages is then not performed, since it would not make sense.

One working example of the invention is illustrated in the drawings and will be described in the following.

DETAILED DESCRIPTION OF THE PREFERRED EMBODIMENTS

Figure 1:
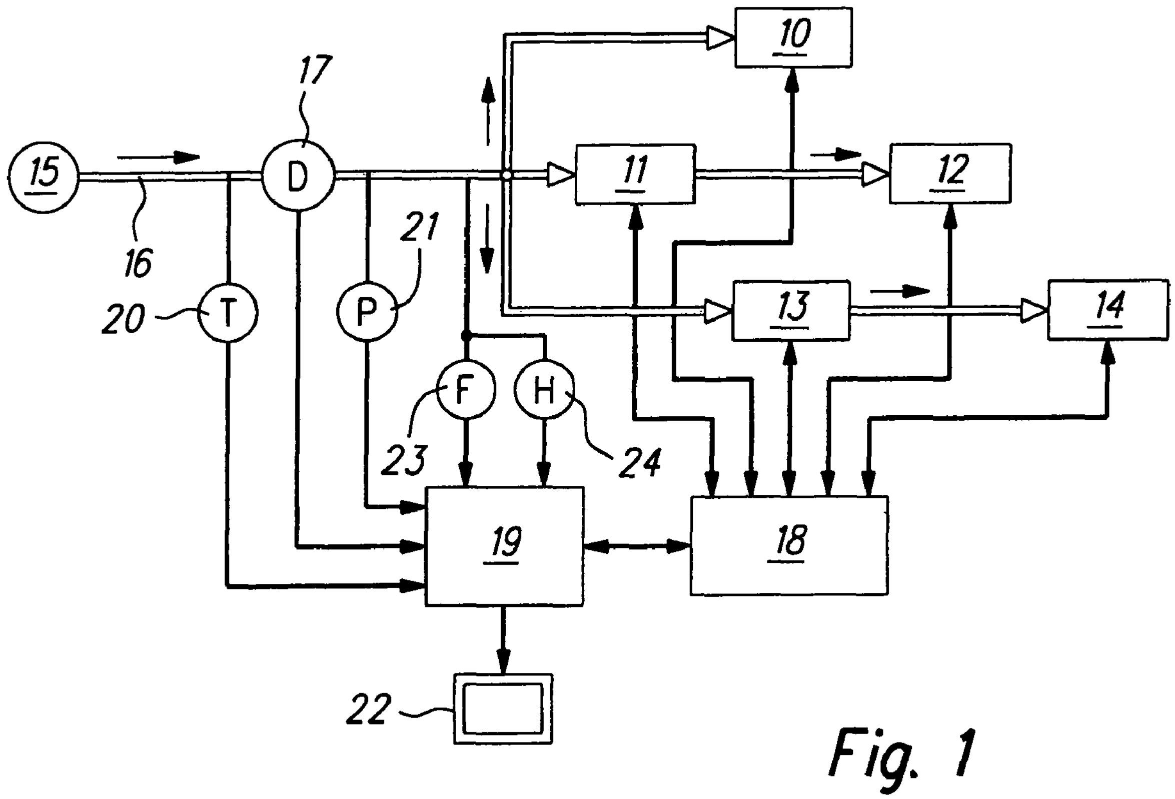
FIG. 1 shows a pneumatic system, on whose supply duct a flow rate measuring instrument is provided.

In FIG. 1 a pneumatic system is represented diagrammatically, the system for example in principle being also one operating with an other fluid such as a hydraulic system.

The pneumatic system comprises five subsystems 10 through 14 which may be respectively actuators, valves, cylinders, linear drives or the like, and also combinations thereof. These subsystems 10 through 14 are supplied by a pressure source 15, a flow rate measuring instrument 17 being arranged on a common supply line 16 for measurement of the flow rate or, respectively, the volumetric flow. The subsystems 11 and 12 on the one hand and the subsystems 13 and 14 constitute a system with a common supply line.

An electronic control device 18 serves for setting the sequence process of the system and is electrically connected with the subsystems 10 through 14 via corresponding control lines. The subsystems 10 through 14 receive control signals from the electronic control device 18 and send sensor signals back to it. Such sensor signals are for example position signals, limit switch signals, pressure signals, temperature signals or the like.

The flow rate measuring instrument 17 is connected with an electronic diagnosis means 19, which additionally receives the signals of a temperature sensor 20 and of a pressure sensor 21 for the measurement of the temperature (T) and of the pressure (P) in the supply duct 16, i. e. of the temperature and of the pressure of the fluid. Moreover a fluid sensor 23 is provided responsive to the type of the fluid employed and a moisture and/or particle sensor 24 responsive to the moisture content and the particle content of the fluid are connected with the diagnosis means 19. The latter additionally has access to the sequence program of the electronic control means 18. The diagnosis results are supplied to a display 22, such diagnosis results naturally additionally being able to be stored, printed, optically and/or acoustically displayed or supplied to a central computer by wires or in a wireless fashion.

The diagnosis means 19 may naturally also be integrated in the electronic control means 18, which for example may comprise a microcontroller for the implementation the sequence program and possibly for diagnosis.

In the case of an extremely large number of subsystems the latter can be divided up into several groups, each group possessing its own flow rate measuring instrument 17 for diagnosis of the parts, assigned to the groups, of the system independently of each other, as is described in the prior art initially mentioned. The method for error containment and diagnosis will now be explained in the following with reference to the system described and the guide value diagrams representation for the FIGS. 2 through 4.

Firstly the guide value and the ascertainment of the guide value are to be described. The volumetric flow in the fluid power system is measured by means of the flow rate the measuring instrument 17 and is divided by the supply pressure P, measured by the pressure sensor 21. This quotient constitutes the guide value quantity 21, which, as summated or integrated over a duty cycle yields the guide value $K_D$:

$$K_D = \int_{t_0}^{t_e} \frac{Q}{P} \cdot dt \qquad (1)$$

This guide value may then now be compensated by the operating temperature T, measured by the temperature sensor 20. Furthermore this guide value can also be adapted (in a manner dependent on the fluid employed, determined by the fluid sensor 23) with the characteristic $K_F$ and optionally in addition with the characteristic $K_H$ in a manner dependent on the moisture content and/or the particle content of the air, measured with the moisture and/or particle sensor 24. Then we have the following guide value:

$$K_D = \int_{t_0}^{t_e} \frac{Q}{P} \cdot \frac{1}{\sqrt{T}} \cdot \sqrt{\frac{K_F}{K_H}} \cdot dt \qquad (2)$$

Dependent of the amount of complexity and accuracy strived at the influences of temperature T and/or the characteristics $K_F$ and, respectively, $K_H$ need not be taken into account so that in the simplest case the guide value only depends on the volumetric flow and the supply pressure.

The guide value is in addition dependent on time and the particular batch, that is to say such operating conditions entail other guide value curves. Such operating states are for example warming up, operation following prolonged idle time, restarting after retooling or operation following predeterminable time intervals, that is to say for example following operation lasting one hour, ten hours or several hours.

For such different operating conditions and different parameters guide value reference curves are produced, for example in a learning process and stored in the diagnosis means 19 in a selection matrix. The diagnosis guide value or, respectively, the diagnosis guide values are characteristic quantities of a fluid power system or, respectively, a fluid power apparatus comprising multiple subsystems. The guide value characterizes the behavior of the overall system or a part of a system during a defined repetitive cycle. It compensates for normal variations and fluctuations in the operating quantities pressure, temperature, moisture, particle content, dependent on how involved its design is. The evaluation of this guide value by means of reference comparison, i. e. a comparison with stored guide value reference curves, accordingly will show the errors and their causes in the fluid system.

Firstly it is necessary to choose a guide value reference curve which is adapted to the respective operating condition and is parameter dependent. This take ends place initially firstly in a fashion dependent on the existing sensor signal. Then the run duration of the system is checked in a manner dependent on the respective operating condition and examined as regards correlation with the firstly chosen guide value reference curve. If the selected guide value reference curve does correlate with the current measurement curve then the diagnosis is cleared. Deviations will then definitely be related to a leakage in the examined period of time and may accordingly be assigned to these actuators subject to errors in accordance with the sequence program.

Firstly however in the case of a run duration deviation being found in the guide value curve a further examination is made as to whether there are constant time slots between characteristic curve point. Thus it is possible, for example for the entire curve sequence to be divided up into a characteristic number of curve points, the time difference between the curve points changing if there is a run duration deviation. For the overall curve course it is necessary for there to be a linear connection of the individual time differences between the curve points within defined limits so that it is possible to assume that there is no error, for example owing to the axes moving bodily moving more rapidly after the starting phase. This means that all time differences of the curve must generally change proportionally.

Should the chosen reference not comply with the required agreement, the diagnosis is cleared, i. e. the deviation is not due to a time shift but to an error condition in the system and more particularly to leakage.

If on the other hand after an initial finding of a run duration deviation there is a finding of a linear connection of the increases within defined limits, there will be a switch over to a another guide value reference curve. This is repeated until a suitable guide value reference curve is found. If none is found, the overall system is outside the operating or working point and a corresponding message is generated, i. e. displayed, reported, stored or the like.

Figure 2:
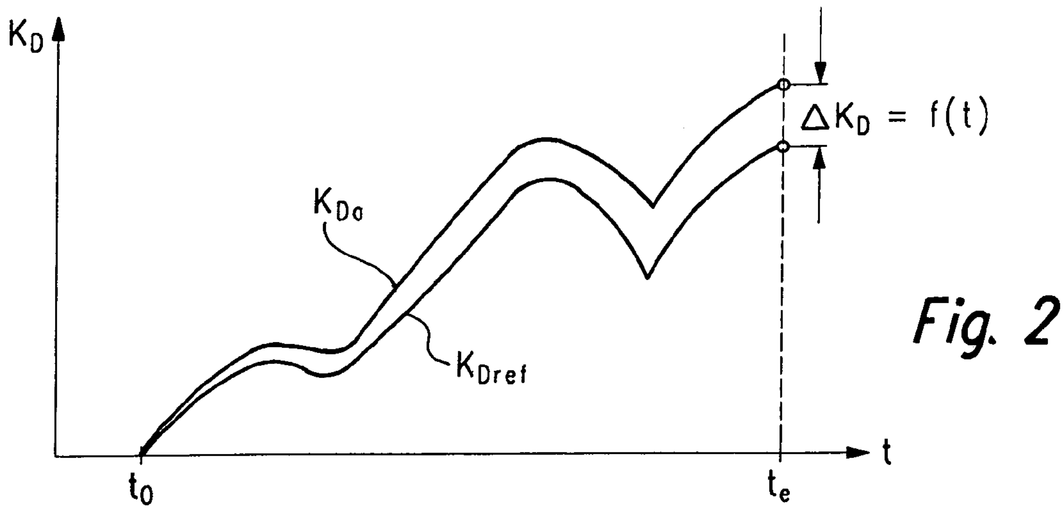
FIGS. 2 through 4 show guide value diagrams for explanation of different results of diagnoses.
Figure 3:
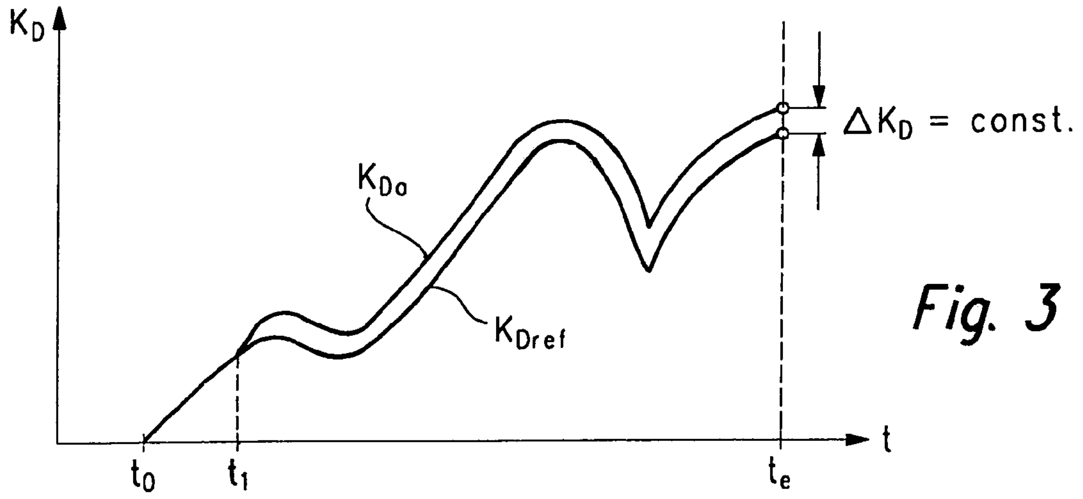
Figure 4:
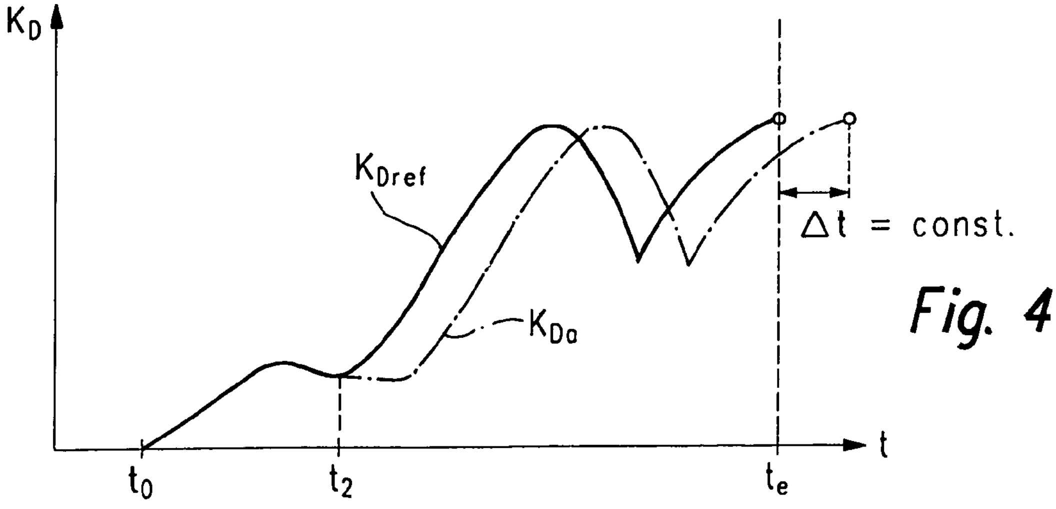

If a suitable guide value reference curve $K_{Dref}$ is found, it is compared with the currently measured guide value curve $K_{Da}$. As shown in FIGS. 2 through 4 three possible cases are illustrated.

As shown in FIG. 2 the measured guide value curve $K_{Da}$ continuously departs more and more from the guide value reference curve $K_{Dref}$. Accordingly the source of the error is clearly a leak, that is to say a system leak in the supply line 16 or lines connected with same. The difference $\Delta K_D$ increases more and more with the time t and is a function of time.

In accordance with FIG. 3 at the point t1 in time there is a deviation $\Delta K_D$, which as from this point in time remains constant until the end to of the cycle. This means that a subsystem, for example a valve actuator unit, which at the point t1 in time was active, is leaky. The point in time of the deviation can be compared with the process representation or control program in the control device 18 in order to locate the subsystem which is the source of the error. If at the point 1 in time several subsystems were active, something which might be the case in large systems, the error must be contained during following activities of such subsystems, in which they are not jointly active at the same time.

As shown in FIG. 4 the cycle duration has changed by the value Δt, the change having occurred at the point t2 in time. The value of the guide value remains constant as from this point t2 in time and only a shift in time occurs. This permits the conclusion that the travel time of the actuator active at this point t2 in time has altered, for example owing to seizure, increased wear, switching errors at the valve or the like. It is accordingly also possible detect timing errors in the pneumatic system on the basis of the guide value.

It is naturally also possible for events as explained with reference to FIGS. 2 through 4 to be accumulative during a cycle and/or occur more than once. On the basis of a corresponding curve course it is then possible to detect several different errors occurring in a cycle. For safety the diagnosis cycles will naturally be repeated on the in order to see whether it is a question of a single error, an inaccurate measurement or a constantly occurring error.

The invention claimed is:

1. A method for error containment and diagnosis in a fluid power system comprising the steps of:

providing a flow rate measuring instrument, a pressure sensor, an electronic diagnostic means and an electronic control device in the fluid power system;

detecting, with the flow rate measuring instrument, a fluid volumetric flow in the overall system or at least one part thereof in each case during a duty cycle of the fluid power system;

detecting, with the pressure sensor, a fluid pressure in each case during the duty cycle;

comparing, with the electronic diagnostic means and the electronic control device, the fluid volumetric flow value (Q) detected by the flow rate measuring system and the fluid pressure (P) detected by the pressure sensor with stored references;

determining, with the electronic diagnostic means and the electronic control device, in each case at the point in time of a deviation or a change in the deviation from the reference, at which component or at which components of the system an event has occurred influencing fluid consumption in order to recognize same as subject to error;

deriving, with the electronic diagnostic means and the electronic control device, guide value quantities (Q/P) from the respective volumetric flow values (Q) and the measured pressure (P);

integrating or summating, with the electronic diagnostic means and the electronic control device, the derived guide value quantities (Q/P) over the duty cycle to form guide values ($K_D$);

choosing a corresponding guide value reference curve ($K_{Dref}$) as a reference from a selection matrix stored in at least one of the electronic diagnostic means and the electronic control device, the selection matrix comprising the guide value reference curves ($K_{Dref}$) or time dependent guide values for different operating conditions.

2. The method as set forth in claim 1, wherein, the different operating states include at least two operating states selected from the group comprising: warming up, operation after a prolonged idle time, restarting after retooling and operation after predeterminable time intervals.

3. The method as set forth in claim 2, wherein the guide value quantities are compensated in a temperature dependent fashion by the factor $1/\sqrt{T}$, where T is the operating temperature.

4. The method as set forth in claim 2, wherein the guide value quantities are adapted in a manner dependent on the type of fluid by the factor $\sqrt{K_F}$, where $K_F$ is a fluid dependent characteristic.

5. The method as set forth claim 2, wherein, prior to the diagnosis for leakages, the run duration of a duty cycle is examined by comparison of the current guide value measurement curve ($K_{Da}$) with a guide value reference curve ($K_{Dref}$) assigned to this duty cycle, a switching over to at least one further guide value reference curve ($K_{Dref}$) only taking place as from a predeterminable deviation.

6. The method as set forth in claim 1, wherein the guide value quantities are compensated in a temperature dependent fashion by the factor $1/\sqrt{T}$, where T is the operating temperature.

7. The method as set forth in claim 6, wherein the guide value quantities are adapted in a manner dependent on the type of fluid by the factor $\sqrt{K_F}$, where $K_F$ is a fluid dependent characteristic.

8. The method as set forth in claim 6, wherein the guide value quantities are adapted for the moisture content and/or the particle content of the fluid by the factor $1/\sqrt{K_H}$, where $K_H$ is a characteristic dependent on moisture and/or particle content.

9. The method as set forth claim 6, wherein, prior to the diagnosis for leakages, the run duration of a duty cycle is examined by comparison of the current guide value measurement curve ($K_{Da}$) with a guide value reference curve ($K_{Dref}$) assigned to this duty cycle, a switching over to at least one further guide value reference curve ($K_{Dref}$) only taking place as from a predeterminable deviation.

10. The method as set forth in claim 1, wherein, the guide value quantities are adapted in a manner dependent on the type of fluid by the factor $\sqrt{K_F}$, where $K_F$ is a fluid dependent characteristic.

11. The method as set forth in claim 10, wherein the guide value quantities are adapted for the moisture content and/or the particle content of the fluid by the factor $1/\sqrt{K_H}$, where $K_H$ is a characteristic dependent on moisture and/or particle content.

12. The method as set forth claim 10, wherein, prior to the diagnosis for leakages, the run duration of a duty cycle is examined by comparison of the current guide value measurement curve ($K_{Da}$) with a guide value reference curve ($K_{Dref}$) assigned to this duty cycle, a switching over to at least one further guide value reference curve ($K_{Dref}$) only taking place as from a predeterminable deviation.

13. The method as set forth in claim 1, wherein, the guide value quantities are adapted for the moisture content and/or the particle content of the fluid by the factor $1/\sqrt{K_H}$, where $K_H$ is a characteristic dependent on moisture and/or particle content.

14. The method as set forth claim 13, wherein, prior to the diagnosis for leakages the run duration of a duty cycle is examined by comparison of the current guide value measurement curve ($K_{Da}$) with a guide value reference curve ($K_{Dref}$) assigned to this duty cycle, a switching over to at least one further guide value reference curve ($K_{Dref}$) only taking place as from a predeterminable deviation.

15. The method as set forth claim 1, wherein, prior to the diagnosis for leakages the run duration of a duty cycle is examined by comparison of the current guide value measurement curve ($K_{Da}$) with a guide value reference curve ($K_{Dref}$) assigned to this duty cycle, a switching over to at least one further guide value reference curve ($K_{Dref}$) only taking place as from a predeterminable deviation.

16. The method as set forth in claim 15, wherein, on a run duration deviation being detected an examination is made as regards the presence of a proportional time shift between current guide value reference curves ($K_{Da}$) and guide value reference curves ($K_{Dref}$) and it is only in the case of the finding of a proportional time shift that there is a switch over to at least one further guide value reference curve ($K_{Dref}$).

17. The method as set forth in claim 16, wherein the case of the predeterminable deviation being exceeded in examined guide value reference curves ($K_{Dref}$) a corresponding message is produced and the diagnosis for leakage is not implemented.

18. The method as set forth in claim 15, wherein, in the case of the predeterminable deviation being exceeded in examined guide value reference curves ($K_{Dref}$) a corresponding message is produced and the diagnosis for leakage is not implemented.

19. The method as set forth in claim 1, wherein, in the case of a large number of components, division up into several groups takes place, which are diagnosed independently of one another.

20. The method as set forth in claim 1, wherein the guide value quantities are adapted for the moisture content and/or the particle content of the fluid by the factor $1/\sqrt{K_H}$, where $K_H$ is a characteristic dependent on moisture and/or particle content.

* * * * *